United States Patent
Burt et al.

(10) Patent No.: US 9,937,916 B2
(45) Date of Patent: Apr. 10, 2018

(54) METHODS AND SYSTEM FOR REDUCING TRANSMISSION SHIFTING

(71) Applicant: Ford Global Technologies, LLC, Dearborn, MI (US)

(72) Inventors: Andrew E. Burt, Royal Oak, MI (US); Bernard D. Nefcy, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 30 days.

(21) Appl. No.: 14/804,817

(22) Filed: Jul. 21, 2015

(65) Prior Publication Data

US 2017/0021825 A1    Jan. 26, 2017

(51) Int. Cl.
*F16H 61/16* (2006.01)
*F16H 61/02* (2006.01)
*B60W 20/30* (2016.01)
*F16H 59/66* (2006.01)

(52) U.S. Cl.
CPC ......... *B60W 20/30* (2013.01); *F16H 61/0213* (2013.01); *F16H 61/16* (2013.01); *B60W 2540/10* (2013.01); *B60W 2550/10* (2013.01); *B60W 2550/142* (2013.01); *B60W 2710/1005* (2013.01); *F16H 59/66* (2013.01); *F16H 2061/163* (2013.01); *Y10S 903/945* (2013.01)

(58) Field of Classification Search
CPC ...... B60W 10/18; B60W 10/06; B60W 10/10; B60W 20/30; B60W 2550/10; B60W 2550/142; B60W 2710/1005; F16H 61/0213; F16H 61/16; F16H 59/66; F16H 2061/163; Y10S 903/945
See application file for complete search history.

(56) References Cited

U.S. PATENT DOCUMENTS

| | | | | |
|---|---|---|---|---|
| 5,775,784 A | * | 7/1998 | Koga | B60L 3/0023 303/122 |
| 7,729,858 B2 | * | 6/2010 | Koike | B60W 30/08 340/436 |
| 8,483,945 B2 | | 7/2013 | Herink | |
| 8,736,483 B2 | | 5/2014 | Takeuchi | |
| 2001/0021682 A1 | * | 9/2001 | Urasawa | B60K 6/485 477/3 |
| 2002/0072449 A1 | * | 6/2002 | Iwase | F16H 61/16 477/97 |
| 2007/0050114 A1 | * | 3/2007 | Koike | B60W 30/08 701/45 |
| 2007/0106459 A1 | * | 5/2007 | Nakayama | G01C 21/3655 701/533 |

(Continued)

FOREIGN PATENT DOCUMENTS

| | | | |
|---|---|---|---|
| EP | 2098761 A1 * | 9/2009 | ............... F16H 1/16 |
| JP | 2005273539 A * | 10/2005 | |
| JP | 2012066735 A * | 4/2012 | |

*Primary Examiner* — Tuan C To
(74) *Attorney, Agent, or Firm* — David Kelley; McCoy Russell LLP

(57) ABSTRACT

Systems and methods for operating a transmission of a hybrid powertrain that includes a motor/generator are described. The systems and methods may permit or inhibit transmission shifting in response to objects or conditions in a vehicles travel path. Transmission shifting is not permitted when conditions indicate the possibility of excessive transmission shifting.

16 Claims, 6 Drawing Sheets

(56) References Cited

U.S. PATENT DOCUMENTS

| | | | |
|---|---|---|---|
| 2007/0278022 A1* | 12/2007 | Tanishima | B60K 6/383 180/65.285 |
| 2008/0176708 A1* | 7/2008 | Tamai | F16H 61/16 477/125 |
| 2011/0224878 A1* | 9/2011 | Nakamura | F16H 61/66259 701/56 |
| 2012/0127017 A1* | 5/2012 | Sasabuchi | G01S 13/931 342/70 |
| 2013/0090822 A1* | 4/2013 | Schwindt | B60K 31/0008 701/70 |
| 2014/0066251 A1* | 3/2014 | Kawamoto | B60W 20/30 477/4 |
| 2014/0229092 A1* | 8/2014 | Hermann | B60K 23/00 701/116 |
| 2014/0249707 A1* | 9/2014 | Riegels | F16H 61/16 701/22 |
| 2014/0257637 A1* | 9/2014 | Sangameswaran | F02D 29/02 701/41 |
| 2015/0239450 A1* | 8/2015 | Yu | B60W 10/06 701/70 |
| 2016/0152144 A1* | 6/2016 | Choi | B60L 7/26 701/70 |
| 2016/0152228 A1* | 6/2016 | Jang | B60W 20/30 701/22 |
| 2016/0201633 A1* | 7/2016 | Quinteros | F02N 11/084 477/111 |
| 2016/0244948 A1* | 8/2016 | Rauma | B60K 6/46 |
| 2016/0318506 A1* | 11/2016 | Kaifuku | B60K 6/44 |
| 2017/0001630 A1* | 1/2017 | Lindstrom | B60K 1/02 |
| 2017/0015301 A1* | 1/2017 | Yamamoto | B60K 6/48 |
| 2017/0015305 A1* | 1/2017 | Bjorkman | B60K 6/365 |
| 2017/0015307 A1* | 1/2017 | Bjorkman | B60K 6/365 |
| 2017/0021825 A1* | 1/2017 | Burt | B60W 20/30 |
| 2017/0028982 A1* | 2/2017 | Bjorkman | F16H 3/728 |
| 2017/0036668 A1* | 2/2017 | Lindstrom | B60W 10/11 |
| 2017/0097055 A1* | 4/2017 | Shibata | F16D 48/06 |
| 2017/0120895 A1* | 5/2017 | Vespasien | B60W 20/30 |
| 2017/0217425 A1* | 8/2017 | Ono | B60W 20/13 |
| 2017/0313302 A1* | 11/2017 | Yagasaki | B60W 20/30 |

* cited by examiner

PRIOR ART OPERATING SEQUENCE

METHODS AND SYSTEM FOR REDUCING TRANSMISSION SHIFTING

FIELD

The present description relates to methods and a system for operating a powertrain of a hybrid vehicle. The methods and systems may be particularly useful for hybrid vehicles that include regenerative braking to conserve energy.

BACKGROUND AND SUMMARY

A hybrid vehicle may enter a regeneration mode or regenerative braking where the vehicle's kinetic energy is converted to electrical energy and stored for later use in response to a vehicle braking request. The hybrid vehicle driver may release an accelerator pedal and wait for a period of time before applying the brake pedal to request vehicle braking. Alternatively, the hybrid vehicle driver may release the accelerator pedal and apply vehicle brakes almost immediately. The different operating scenarios may make it more difficult for a transmission to select a desirable gear. Further, the hybrid vehicle's efficiency may be reduced if the transmission selects an undesirable gear because the engine and/or motor may not operate at a speed that is as efficient as is desired.

The inventors herein have recognized the above-mentioned issues and have developed an operating method for a vehicle, comprising: receiving data of an object or condition external the vehicle to a controller; and not permitting transmission shifting in response to the object external to the vehicle.

By not permitting transmission shifting between different ratios of a fixed ratio transmission, it may be possible to provide the technical result of reducing the possibility of perceived excessive transmission shifting which may lead to driver annoyance. Further, transmission shifting may be made more repeatable and expected for different driving conditions. In one example, one or more sensors may detect or predict vehicle braking and entry into a regenerative braking mode in response to objects or conditions in a vehicle's travel path. An object or condition in the vehicle's travel path may be indicative that the powertrain may shift multiple times in a short period of time if the transmission were permitted to shift during a vehicle braking sequence. The transmission may be held in its present gear during conditions where vehicle braking may be expected so that multiple short duration shifts may be avoided.

The present description may provide several advantages. For example, the approach may reduce a total actual number of transmission gear shifts during a time after an accelerator pedal is released and while the vehicle is in a regenerative braking mode. In addition, the approach may improve a driver's perception of vehicle operation. Further, the approach may anticipate vehicle braking or ignore selected conditions that may indicate the possibility of vehicle braking to improve transmission shifting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
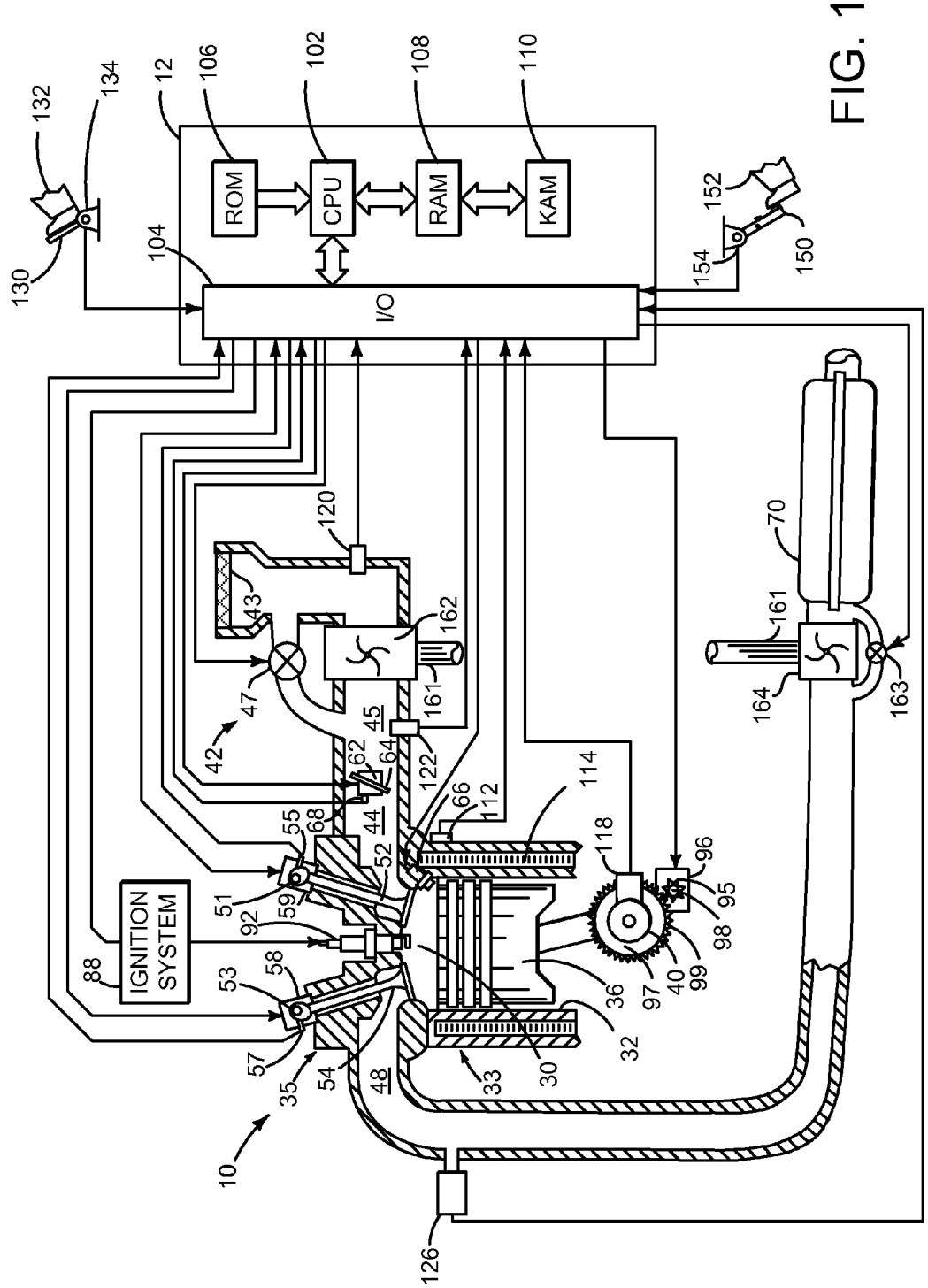
FIG. 1 is a schematic diagram of an engine.
Figure 2:
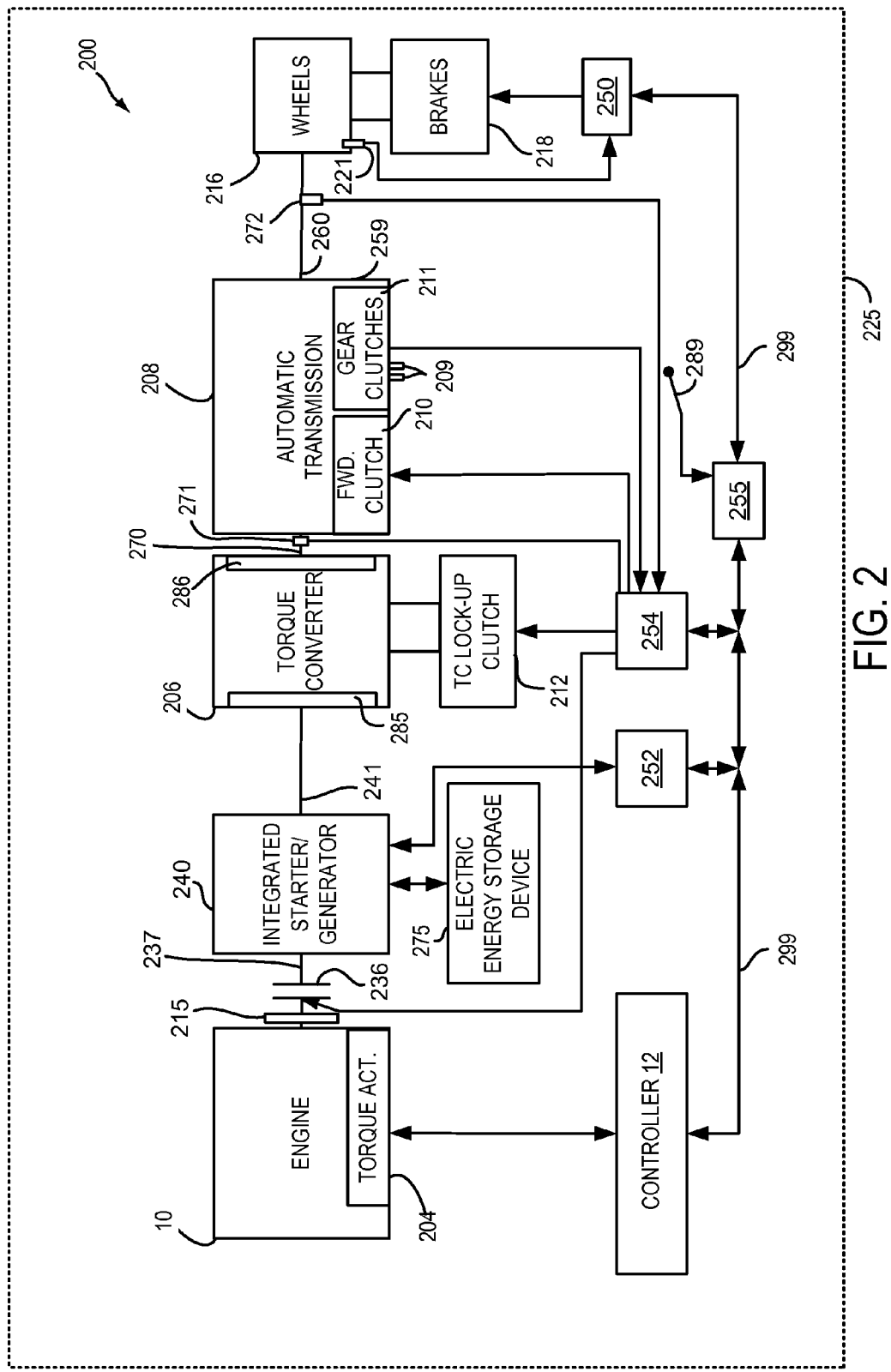
FIG. 2 is a schematic diagram of a hybrid vehicle powertrain.
Figure 3:
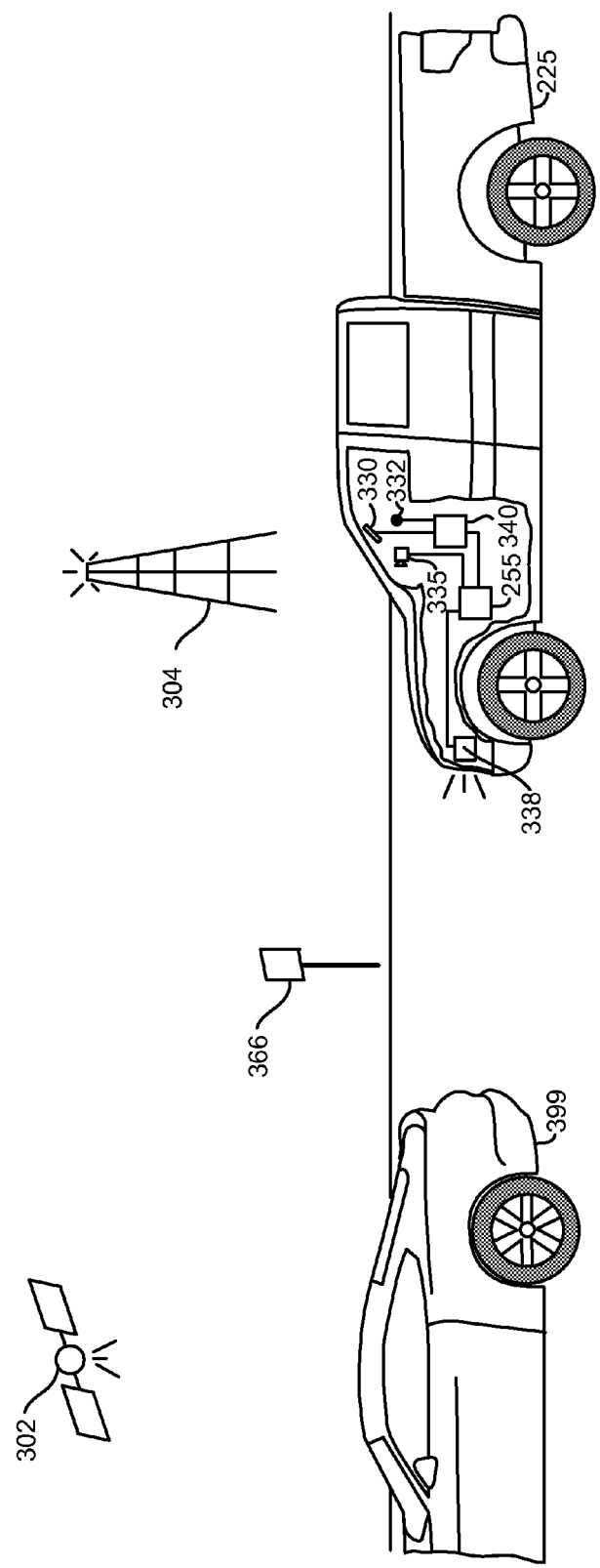
FIG. 3 shows an example vehicle in which the hybrid powertrain may operate.
Figure 4:
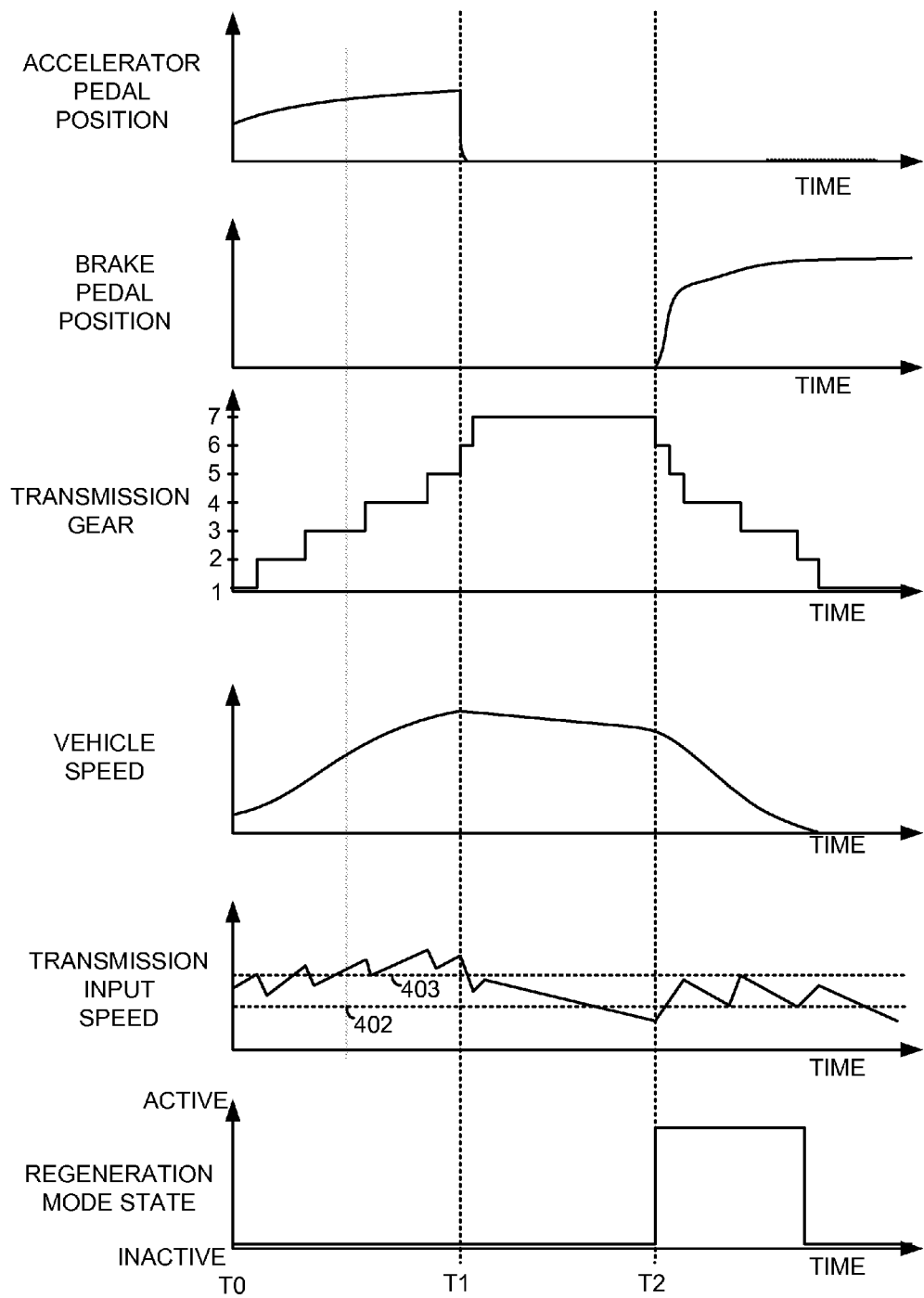
FIGS. 4 and 5 show example operating sequences for operating a hybrid powertrain.
Figure 5:
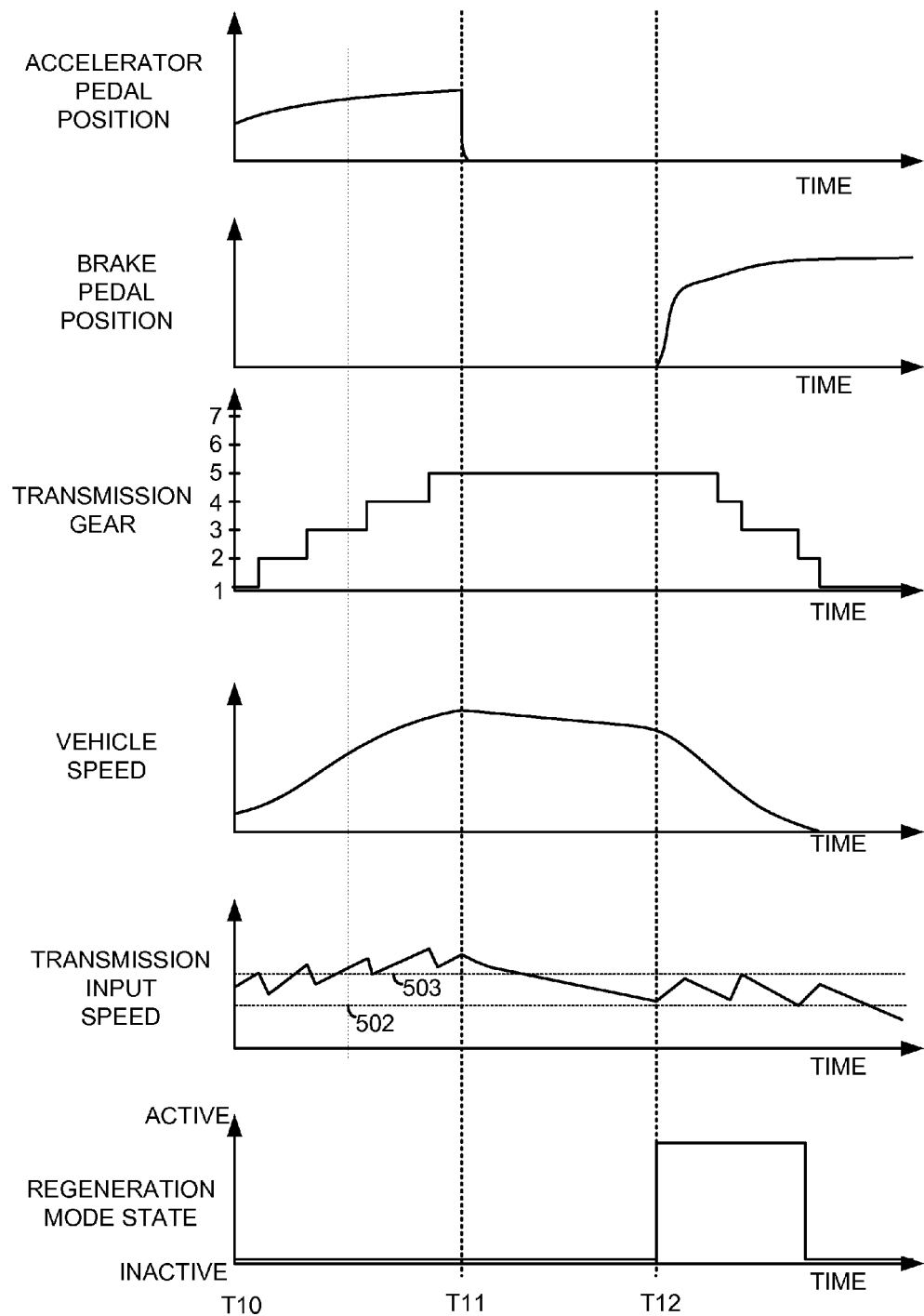

The present description is related to monitoring a powertrain of a hybrid vehicle during regeneration. The hybrid vehicle may include an engine as is shown in FIG. 1. The engine of FIG. 1 may be included in a powertrain as is shown in FIG. 2. The powertrain may be included in a vehicle as is shown in FIG. 3. A prior art operating sequence is shown in FIG. 4. The powertrain according to the present system and method may operate as shown in the sequence of FIG. 5. The powertrain operates according to the method shown in FIG. 6.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain 200. The powertrain of FIG. 2 includes engine 10 shown in FIG. 1. Powertrain 200 is shown including vehicle system controller 255, engine controller 12, electric machine controller 252, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of powertrain disconnect clutch 236 through dual mass flywheel 215. Disconnect clutch 236 may be electrically or hydraulically actuated. The downstream side of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Vehicle system controller 255 may also receive other vehicle information such as positioning information as described in detail in FIG. 3. Vehicle controller 255 may also receive input from turn signal selector 289 to determine a driver's intent to change road lanes or to turn onto a different road such that vehicle system controller 255 may know a driver's intent to alter vehicle operation before the vehicle turns.

Referring now to FIG. 3, vehicle 225 includes vehicle system controller 225 for receiving sensor data and adjusting actuators. In some examples, vehicle system controller 225 may cooperate with additional controllers as shown in FIG. 2 to operate vehicle 225. Vehicle 225 is shown with global positioning system (GPS) receiver 330. Satellite 302 provides time stamped information to GPS receiver 330 which relays the information to vehicle position determining system 340. Vehicle positioning determination system 340 relays present and future road grade data to controller 12. Vehicle 225 may also be equipped with optional camera 335 for surveying road conditions in the path of vehicle 225. For example, camera 335 may acquire road conditions from road side signs 366 or displays. Vehicle position determining system 340 may alternatively acquire information for determining vehicle position from stationary broadcast tower 304 via receiver 332. In some examples, vehicle 225 may also include a sensor 338 for determining the proximity of vehicles and objects in the travel path of vehicle 225. Sensor 138 may be laser, sound, or radar signal based sensor that senses other vehicles 399 or objects in the path of vehicle 225.

Thus, the system of FIGS. 1-3 provides for a system, comprising: an engine; a motor/generator; an object sensor; and a controller including executable instructions stored in non-transitory memory for receiving data from the object sensor and not permitting transmission shifting in response to indication of an object in a travel path of a vehicle based on the data from the object sensor. The system further comprises additional instructions to permit transmission shifting in response to a position of a turn indicator while the object sensor is providing an indication of an object in the travel path of the vehicle. The system further comprises additional instructions to permit transmission shifting in response to an absence of the object in the travel path of the vehicle after not permitting transmission shifting. The system further comprises additional instructions to shift the transmission in response to a first shift schedule in the absence of the object in the travel path of the vehicle. The system further comprises additional instructions to shift the transmission based on a second shift schedule after not permitting transmission shifting, the second shift schedule based on the vehicle operating a vehicle in a regeneration mode and an object or condition in the vehicle's travel path.

Referring now to FIG. 4, an example operating sequence of a prior art vehicle is shown. The operating sequence may be provided via a hybrid vehicle. The first plot from the top of FIG. 4 is a plot of accelerator pedal position versus time. The accelerator pedal may be operated via a driver. The vertical axis represents accelerator pedal position and accelerator pedal position increases (e.g., is applied or depressed further) in the direction of the vertical axis arrow. The horizontal axis represents time and time increases from the left side of the plot to the right side of the plot.

The second plot from the top of FIG. 4 is a plot of brake pedal position versus time. The brake pedal may be operated via a driver. The vertical axis represents brake pedal position and brake pedal position increases (e.g., is applied or depressed further) in the direction of the vertical axis arrow. The horizontal axis represents time and time increases from the left side of the plot to the right side of the plot.

The third plot from the top of FIG. 4 is a plot of active transmission gear versus time. The vertical axis represents active transmission gear and the respective transmission gears are shown along the vertical axis. The horizontal axis represents time and time increases from the left side of the plot to the right side of the plot.

The fourth plot from the top of FIG. 4 is a plot of vehicle speed versus time. The vertical axis represents vehicle speed and vehicle speed increases in the direction of the vertical axis arrow. The horizontal axis represents time and time increases from the left side of the plot to the right side of the plot. Horizontal line 402 represents a lower transmission input shaft speed threshold above which the ISG operates at a higher efficiency. Horizontal line 403 represents a higher transmission input shaft speed threshold below which the ISG operates at a higher efficiency. The ISG operates a lower efficiency at speeds above threshold 403 and below threshold 402.

The fifth plot from the top of FIG. 4 is a plot of transmission input shaft speed versus time. The vertical axis represents transmission input shaft speed and transmission input shaft speed increases in the direction of the vertical axis arrow. The horizontal axis represents time and time increases from the left side of the plot to the right side of the plot.

The sixth plot from the top of FIG. 4 is a plot of regenerative braking state versus time. The vertical axis represents regenerative braking state and powertrain is in regeneration when the trace is at a higher level near the vertical axis arrow. The powertrain is not in regeneration mode when the trace is at a lower level near the horizontal axis arrow. The horizontal axis represents time and time increases from the left side of the plot to the right side of the plot.

At time T0, the accelerator pedal position is applied to a middle level and the brake pedal is not applied. The transmission is in first gear and the vehicle speed is at a lower level. The transmission input shaft speed is between threshold 402 and threshold 403. The powertrain is not in regeneration mode.

Between time T0 and time T1, the accelerator pedal is depressed further by a driver (not shown) and the transmission shifts from first gear into second gear, third gear, fourth gear, and fifth gear. Vehicle speed continues to increase and the vehicle brakes are not applied. The transmission input shaft speed increases and decreases as the transmission shifts. The powertrain is not in regeneration mode.

At time T1, the driver (not shown) releases the accelerator pedal to reduce the driver demand torque. The brake pedal is not applied and the transmission upshifts to sixth gear (e.g., a higher gear) to reduce engine speed to improve engine efficiency. The vehicle speed begins to be reduced and the transmission input shaft speed decreases in response to shifting to a higher gear. The powertrain is not in regeneration mode.

Between time T1 and time T2, the transmission is upshifted a second time into seventh gear to further reduce engine speed and improve engine efficiency. The accelerator pedal and the brake pedal are not applied. Vehicle speed continues to decrease and the transmission input shaft speed continues to decrease. The powertrain is not in regeneration mode.

At time T2, the driver (not shown) applies the brake pedal. As a result, the vehicle enters regenerative braking mode as indicated by the regeneration mode state transitioning to a higher level. The transmission is downshifted from seventh gear to fourth gear in a short period of time so that the transmission input shaft speed is within a range where the ISG operates efficiently (e.g., between threshold 402 and threshold 403). The transmission input shaft speed is also reduced to a level below 402 where ISG efficiency is reduced. Vehicle speed continues to decrease.

After time T2, the transmission continues to downshift in response to vehicle speed and a desired transmission input shaft speed which is held between threshold 402 and threshold 403. The transmission is downshifted as vehicle speed approaches zero.

The time period between time T1 and time T2 may be a long or short interval depending upon when the driver applies the brake pedal. If the duration is short, the transmission is shifted between fourth, fifth, sixth, and seventh gears in a short period of time so that the driver may perceive the shifting to be excessive.

Figure 6:
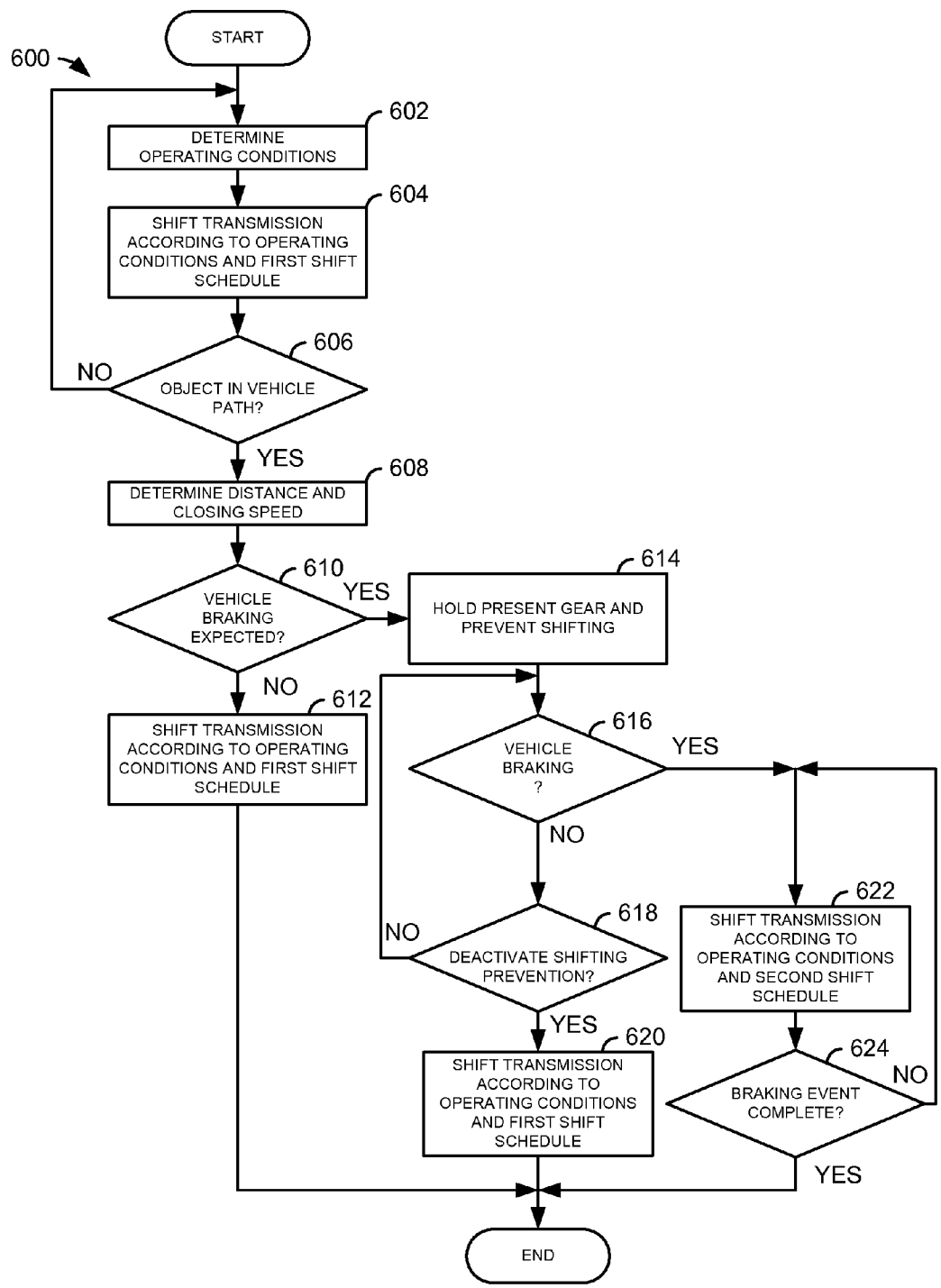
FIG. 6 shows an example method for operating a vehicle powertrain.

Referring now to FIG. 5, an example operating sequence according to the method of FIG. 6 is shown. The operating sequence may be provided via a hybrid vehicle as is shown in FIGS. 1-3. The six plots of FIG. 5 show the same variables shown in FIG. 4. Therefore, for the sake of brevity, the description of the plot variables is omitted, but the plot variables of FIG. 5 are the same as those of FIG. 4 unless otherwise described. The sequence of FIG. 5 may be provided by the system of FIGS. 1-3 according to the method of FIG. 6.

At time T10, the accelerator pedal position is applied to a middle level and the brake pedal is not applied. The transmission is in first gear and the vehicle speed is at a lower level. The transmission input shaft speed is between threshold 502 and threshold 503. The powertrain is not in regeneration mode.

Between time T10 and time T11, the accelerator pedal is depressed further by a driver (not shown) and the transmission shifts from first gear into second gear, third gear, fourth gear, and fifth gear. Vehicle speed continues to increase and the vehicle brakes are not applied. The transmission input shaft speed increases and decreases as the transmission shifts. The powertrain is not in regeneration mode. The vehicle's sensors also detect an object or driving condition in the vehicle's path (not shown). The object may be another vehicle, a pedestrian, a stop sign or another indication that the vehicle may stop or reduce speed in the near future.

At time T11, the driver (not shown) releases the accelerator pedal to reduce the driver demand torque in response to driving conditions. The brake pedal is not applied and the transmission is held in its present gear (e.g., 5$^{th}$ gear) to reduce transmission shifting in response to the possibility vehicle braking due at least in part to an objected being detected in the vehicle's path and release of the accelerator pedal. The vehicle speed begins to be reduced and the transmission input shaft speed decreases at a speed proportionate to the vehicle speed decrease. The powertrain is not in regeneration mode.

Between time T11 and time T12, the transmission is held in its present gear (e.g., 5$^{th}$ gear) and the transmission input shaft speed decreases as vehicle speed decreases. The accelerator pedal and the brake pedal are not applied. Vehicle speed continues to decrease and the transmission input shaft speed continues to decrease. The powertrain is not in regeneration mode. The number of gear shifts has already been reduced by two as compared to the sequence shown in FIG. 4.

At time T12, the driver (not shown) applies the brake pedal. As a result, the vehicle enters regenerative braking mode as indicated by the regeneration mode state transitioning to a higher level. The transmission is not immediately downshifted. Rather, the transmission is downshifted in response to the transmission input shaft speed approaching the lower threshold 502. In this way, the transmission input shaft speed is held within a range where the ISG operates efficiently (e.g., between threshold 502 and threshold 503). Vehicle speed continues to decrease and the sequence ends.

In this way, a total actual number of transmission shifts may be reduced in response to expected vehicle braking. The expected vehicle braking may be based on sensed objects or conditions in a vehicle's travel path.

Referring now to FIG. 6, a method for operating a vehicle powertrain is shown. At least portions of method 600 may be implemented as executable controller instructions stored in non-transitory memory. Additionally, portions of method 600 may be actions taken in the physical world to transform an operating state of an actuator or device. In the description of FIG. 6, "the vehicle" refers to the vehicle in which transmission shifting is controlled (e.g., vehicle 225 of FIGS. 2 and 3).

At 602, method 600 determines vehicle operating conditions. Vehicle operating conditions may include but are not limited to vehicle speed, driver demand torque, transmission input shaft speed, battery state of charge, vehicle location, absence or presence of objects in the vehicle's path, accelerator pedal position, and brake pedal position. Vehicle operating conditions may be determined via a controller querying its inputs. Method 600 proceeds to 604 after operating conditions are determined.

At 604, method 600 shifts the vehicle's transmission in response to operating conditions. In one example, the vehicle's transmission is shifted in response to a first shift schedule that is stored in controller memory. The transmission shifts in response to driver demand torque (e.g., torque based on accelerator pedal position and vehicle speed) and vehicle speed. Method 600 proceeds to 606 after the transmission is shifted in response to the first shift schedule.

At 606, method 600 judges if an object or condition is in the vehicle's path that may result in vehicle braking or entry into regeneration mode. In one example, method 600 may judge that an object is in the vehicle's travel path based on laser, sonic, or radar signals interacting with the object and the vehicle's sensors. In another example, method 600 may determine that the vehicle is expected to stop 1500 meters ahead based on a location of a traffic signal (e.g., stop sign or light) stored in a geographical map in memory of the vehicle position determining system. Further, method 600 may judge that a condition is in the vehicle's path. The condition may include a road grade the vehicle is traveling. For example, a negative road grade may be indicative of a desire for lower driver demand torque to maintain vehicle speed to less than a threshold speed. Therefore, it may be determined that the road grade will lead to vehicle braking. In some examples, the presence or absence of an object or condition in the vehicle's path may be assessed based on being within a predetermined time or distance of the vehicle based on the vehicle's present speed and travel path. For example, method 600 may determine if the object or condition is within 1500 meters of the vehicle or within 5 seconds of vehicle travel time based on vehicle path and speed. If method 600 judges that there is an object or condition in the vehicle's path, the answer is yes and method 600 proceeds to 608. Otherwise, the answer is no and method 600 returns to 602.

At 608, method 600 determines a distance and closing speed to the object or condition determined at 606. In one example, the distance to the object may be determined based on an amount of time it takes for a signal to travel from the vehicle to the object or condition and back to the vehicle. For example, a distance to the object may be determined by multiplying a speed of the speed of the sensing medium (e.g., light, sound, radar, etc.) by an amount of time it takes for the sensing medium to travel from the vehicle to the object and back divided by two and further accounting for the vehicle's present speed. The closing speed may be estimated by determining a first distance between the vehicle and the object or condition at a first time, determining a second distance between the vehicle and the object or condition at a second time, and dividing the difference between the first distance and the second distance by the difference between the first time and the second time. Method 600 proceeds to 610 after the distance and closing speed to the object or condition are determined.

At 610, method 600 judges if vehicle braking is expected. In one example, method 600 may judge that vehicle braking is expected based on predetermined conditions. For example, method 600 may judge that vehicle braking or regeneration is expected if an object or condition is within a predetermined distance of the vehicle and the closing speed is greater than a threshold speed. Further, method 600 may for some conditions determine that braking is expected only after an accelerator pedal is released to its base position. Similarly, method 600 may determine that vehicle braking is expected if a stop sign or traffic light is present and the vehicle is closing on the stop sign or traffic signal. Method 600 may judge that vehicle braking is not expected if the distance between the vehicle and the object is increasing (e.g., the object is accelerating away from the vehicle). Further, method 600 may also utilize other vehicle operating conditions such as a position of a vehicle turn selector. For example, method 600 may judge that vehicle braking is not expected if an object is in front of the vehicle and the vehicle turn selector indicates that the driver intends to pass the object in a passing lane. Thus, applying the turn indicator may be indicative of intent to avoid vehicle braking so that sensor data of an object in the vehicle's travel path may be ignored for purposes of controlling transmission shifting. If method 600 judges that vehicle braking is expected based on controller inputs, the answer is yes and method 600 proceeds to 614. Otherwise, the answer is no and method 600 proceeds to 612.

In some examples, method 600 may judges that the vehicle is expected to enter regeneration mode where the vehicle's kinetic energy is converted into electrical energy at 610 based on the previous conditions already discussed as a basis for judging if vehicle braking is expected. If method 600 judges that it is expected for the vehicle to enter regeneration mode based on controller inputs, the answer is yes and method 600 proceeds to 614. Otherwise, the answer is no and method 600 proceeds to 612.

At 612, method 600 shifts the transmission according to the first shift schedule mentioned at 604. Thus, method 600 shifts according to a shift schedule for nominal operating conditions when no object is in the vehicle's travel path. In one example, the shift schedule may be based on conditions for when the vehicle is not operating in a regeneration mode. It may be expected that the transmission will upshift to a higher gear to reduce engine fuel consumption if the driver releases the accelerator pedal. Method 600 proceeds to exit after the transmission begins shifting based on the first shift schedule.

At 614, method 600 holds the present transmission gear. In other words, the transmission is prevented from upshifting to a higher in response to expected vehicle braking. By holding the transmission gear constant, multiple transmission shifts may be avoided. Further, the vehicle may enter a regeneration mode when the transmission gear is held in the presently selected gear. Alternatively, the vehicle may not enter regeneration mode when the transmission gear is held in its presently selected gear. The transmission gear may be held via holding a state of a transmission clutch closed via a transmission shift solenoid. Method 600 proceeds to 616 after the transmission begins to be held in its present gear.

At 616, method 600 judges if vehicle braking is active. Vehicle braking may be active in response to a driver applying a brake pedal. Alternatively, a controller may activate vehicle brakes in response to vehicle sensor data. In one example, the vehicle enters regenerative braking mode in response to vehicle braking. If method 600 judges that vehicle braking is present, the answer is yes and method 600 proceeds to 622. Otherwise, the answer is not and method 600 proceeds to 618. Additionally, in some examples, the powertrain may enter regenerative braking mode in response to vehicle braking being activated.

At 618, method 600 judges if shifting prevention is to be deactivated. In other words, method 600 judges if transmission shifting is permitted. In one example, transmission shifting may be permitted in response to transmission input shaft speed being within a predetermined threshold upper (e.g., a lower speed threshold (502 of FIG. 5) or higher speed threshold (503 of FIG. 5)). Specifically, shifting may be permitted to maintain transmission input speed above the lower threshold and below the higher threshold. In another example, method 600 deactivates transmission shifting prevention (e.g., not allowing shifting an remaining in the present transmission gear) in response to an amount of time expiring (e.g., 30 seconds) since expected braking was determined. In other examples, method 600 deactivates transmission shifting prevention in response to an increase in accelerator pedal position (e.g., an increase in requested vehicle torque). Further, combinations and sub-combinations of time and accelerator pedal position may be a basis for deactivating transmission shifting prevention. If method 600 judges that transmission shifting is to be permitted, the answer is yes and method 600 proceeds to 620. Otherwise, the answer is no and method 600 returns to 616.

At 620, method 600 shifts the transmission according to the first shift schedule mentioned at 604. Method 600 shifts according to a shift schedule for nominal operating conditions when no object is in the vehicle's travel path. Alternatively, in some examples, method 600 may shift the transmission in response to a third transmission shift schedule based on an object or condition in the vehicle path while the vehicle is not in a regeneration mode. The third shift schedule may be different than the first and second shift schedules. In one example, the third shift schedule may downshift the transmission at higher vehicle speeds to slow the vehicle sooner than the first transmission shift schedule. Method 600 proceeds to exit after the transmission begins shifting based on the first shift schedule.

At 622, method 600 shifts the transmission according to a second shift schedule that is different than the first transmission shifting schedule. The second schedule may be based on desired transmission shift conditions while the vehicle is in a regenerative braking mode. The shift conditions may include transmission input shaft speeds corresponding to vehicle speeds and driver demand torques where the ISG operates at a speed above a lower speed threshold (e.g., 502, of FIG. 5) and below a higher speed threshold (e.g., 503 of FIG. 5). Further, the transmission may be prohibited from upshifting to a higher gear in some examples so that the possibility of excessive transmission shifting may be avoided.

At 624, method 600 judges whether or not the vehicle braking event is complete. In one example, the braking event may be determined complete in response to an increase in accelerator pedal position or an increase in driver demand torque. Further, other conditions such as the vehicle reaching zero speed may indicate that the vehicle braking event is complete. Further, the vehicle braking event may be determined to be complete in response to the object moving out of the vehicle's path. If method 600 judges that the vehicle braking event is complete, the answer is yes and method 600 proceeds to exit. Otherwise, the answer is no and method 600 returns to 622.

In this way, a total actual number of transmission shifts immediately before and during a regenerative vehicle braking sequence may be reduced so that frequent shifting may be reduced. Further, vehicle braking may be anticipated in response to vehicle operating conditions. In addition, an indication of expected vehicle braking may not be provided if the vehicle driver indicates intentions to pass the object in its path via a turn selector.

Thus, the method of FIG. 6 provides for an operating method for a vehicle, comprising: receiving data of an object or condition external the vehicle to a controller; and not permitting transmission shifting in response to the object external to the vehicle. The method includes where the object is a vehicle and the data is received via a laser, sonic, or radar sensor. The method includes where the object is a stop sign or a traffic signal. The method includes where the condition is a road grade. The method includes where the road grade is based on a geographical map stored in memory. The method further comprises permitting transmission shifting after not permitting transmission shifting in response to applying an accelerator pedal.

The method of FIG. 6 also provides for an operating method for a vehicle, comprising: receiving data of an object or condition external the vehicle to a controller; judging if vehicle braking is expected in response to the data of the object external the vehicle; and not permitting transmission shifting in response to the judgement. The method includes where judging if vehicle braking is expected is based on a distance to the object. The method includes where the judging if vehicle braking is expected is further based on a closing speed between the vehicle and the object. The method includes where transmission shifting is not permitted via holding a state of a transmission gear clutch via a transmission shift solenoid. The method further comprises shifting the transmission in response to a transmission shift schedule based on operating the vehicle in a regeneration mode.

In some examples, the method further comprises permitting transmission downshifting after not permitting transmission shifting in response to vehicle speed. The method further comprises permitting transmission shifting after not permitting transmission shifting in response to an amount of time elapsing. The method further comprises permitting transmission shifting after not permitting transmission shifting in response to an increase in driver demand torque. The method further comprises permitting transmission shifting after not permitting transmission shifting in response to an absence of the object or condition in the vehicle's travel path.

In still other examples, the method of FIG. 6 receives vehicle sensor data to a controller and judges via the controller to maintain a presently engaged transmission gear or downshift the transmission to a lower gear responsive to vehicle sensor information and an ISG efficiency range, the ISG efficiency range defined or bounded by a lower ISG or transmission input sped speed and an upper ISG or transmission input speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. An operating method for a hybrid vehicle, comprising:
receiving data of an object or condition external the vehicle to a controller;
judging if regenerative vehicle braking is expected via the controller in response to the data of the object external the vehicle;
not permitting transmission upshifting via the controller in response to the judgement via the controller; and
permitting shifting of a transmission in response to an absence of the object in a travel path of the vehicle after not permitting transmission upshifting.

2. The method of claim 1, where the object is a vehicle and the data is received via a laser, sonic, or radar sensor.

3. The method of claim 1, where the object is a stop sign or a traffic signal.

4. The method of claim 1, where the condition is a road grade.

5. The method of claim 4, where the road grade is based on a geographical map stored in memory.

6. The method of claim 1, further comprising permitting transmission upshifting after not permitting transmission upshifting in response to applying an accelerator pedal.

7. An operating method for a vehicle, comprising:
receiving data of an object or condition external the vehicle to a controller;
judging if vehicle braking is expected via the controller in response to the data of the object external the vehicle;
not permitting transmission shifting in response to the judgement via the controller; and
permitting transmission downshifting after not permitting transmission shifting in response to vehicle speed.

8. The method of claim 7, where judging if vehicle braking is expected is based on a distance to the object.

9. The method of claim 8, where the judging if vehicle braking is expected is further based on a closing speed between the vehicle and the object.

10. The method of claim 7, where transmission shifting is not permitted via holding a state of a transmission gear clutch via a transmission shift solenoid.

11. The method of claim 7, further comprising shifting a transmission in response to a transmission shift schedule based on operating the vehicle in a regeneration mode.

12. A system, comprising:
an engine;
a motor/generator;
a transmission mechanically coupled to the engine and the motor/generator;
an object sensor;
a controller including executable instructions stored in non-transitory memory for receiving data from the object sensor and not permitting shifting of the transmission in response to an indication of an object in a travel path of a vehicle based on the data from the object sensor and further in response to a judgment of regenerative braking based on the indication; and
additional instructions to permit shifting of the transmission in response to an absence of the object in the travel path of the vehicle after not permitting shifting of the transmission.

13. The system of claim 12, further comprising additional instructions to shift the transmission in response to a first shift schedule in the absence of the object in the travel path of the vehicle.

14. The system of claim 13, further comprising additional instructions to shift the transmission based on a second shift schedule after not permitting shifting of the transmission, the second shift schedule based on the vehicle operating in a regeneration mode and an object or condition in the vehicle's travel path.

15. An operating method for a vehicle, comprising:
receiving data of an object or condition external the vehicle to a controller;
judging if vehicle braking is expected via the controller in response to the data of the object external the vehicle;
not permitting transmission shifting in response to the judgement via the controller; and
permitting transmission shifting after not permitting transmission shifting in response to an amount of time elapsing.

16. An operating method for a vehicle, comprising:
receiving data of an object or condition external the vehicle to a controller;
judging if vehicle braking is expected via the controller in response to the data of the object external the vehicle;
not permitting transmission shifting in response to the judgement via the controller; and
permitting transmission shifting after not permitting transmission shifting in response to an increase in driver demand torque.

* * * * *